April 16, 1935.  E. M. HUNTER  1,998,318
ELECTRICAL PROTECTIVE SYSTEM
Filed July 21, 1932
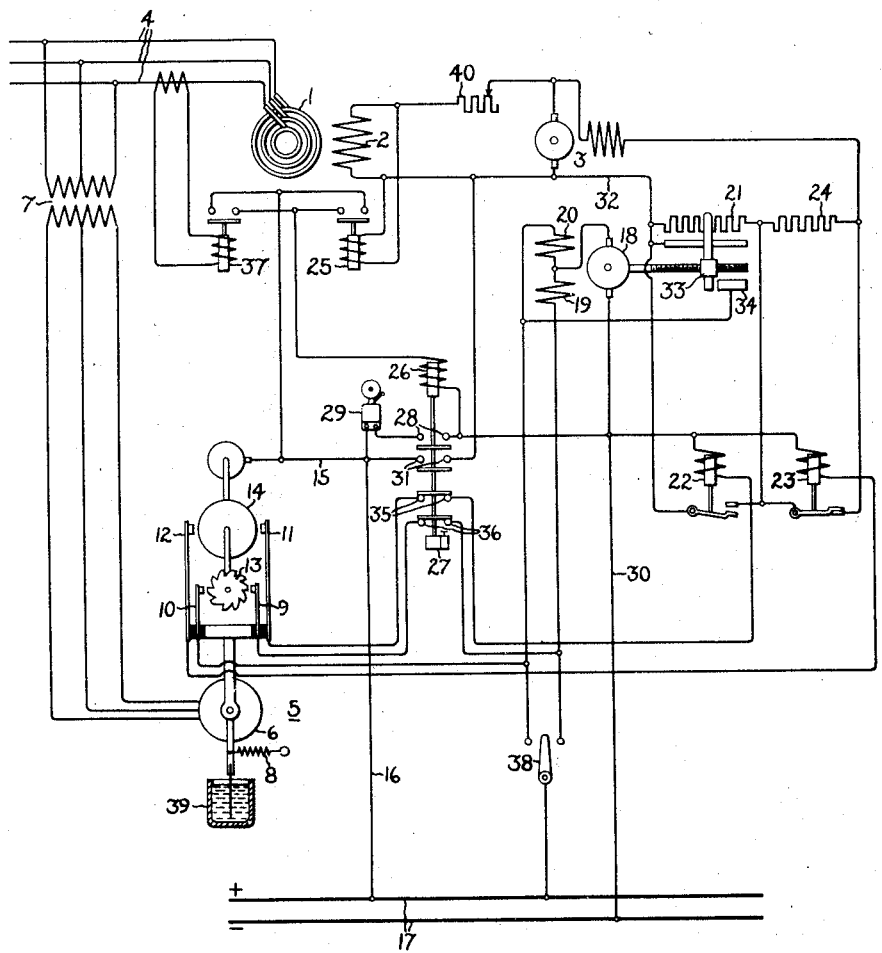
Inventor:
Eugene M. Hunter,
by Charles A. Mullen
His Attorney.

Patented Apr. 16, 1935

1,998,318

UNITED STATES PATENT OFFICE 1,998,318

ELECTRICAL PROTECTIVE SYSTEM

Eugene M. Hunter, Scotia, N. Y., assignor to General Electric Company, a corporation of New York Application July 21, 1932, Serial No. 623,749

4 Claims. (Cl. 171—312)

My invention relates broadly to electrical protective systems and more particularly to an automatic system for limiting the temperature rise of dynamo-electric machines.

It is a well known fact that the life of organic electrical insulating material decreases rapidly with increases in its average operating temperature. It is therefore important not only to limit the maximum operating temperature of electrical machinery but also to keep its average operating temperature as low as possible. Ratings, or guarantees, if based upon a maximum temperature would often be unsatisfactory because the loading, or cooling, requirements to give a predetermined maximum machine temperature will vary widely with variations in the ambient temperature of the machine. Thus, a machine which is adjusted to carry a predetermined maximum load without exceeding a given maximum temperature will have a high average operating temperature at low ambient temperatures and will greatly exceed the given maximum temperature at high ambient temperatures. In order to have a temperature rating, or guarantee, which is substantially independent of ambient temperature conditions, the idea of basing the temperature rating on the temperature rise of the machine has been widely adopted. Thus, a machine is rated not to exceed a given temperature rise at continuous full load operation. Such a rating depends upon the fact that it requires substantially the same amount of heat to produce the same temperature rise in a given machine, regardless of the ambient temperature. The rated temperature rise is determined by subtracting the maximum probable ambient temperature from the maximum allowable machine temperature.

Thus a common rating is an 80° temperature rise, which is based on a maximum permissible temperature of 120° at a maximum probable ambient of 40°.

In view of the fact that temperature ratings are now generally based upon temperature rise there has been a demand for an automatic arrangement for preventing machine temperature rises from exceeding a guaranteed value. In accordance with my invention I provide an arrangement for this purpose which is particularly adapted for use in connection with dynamo-electric machines which have field windings. It consists essentially of a properly calibrated voltage responsive circuit controller, or relay, connected across the field winding of the dynamo-electric machine, whose temperature rise is to be limited, and arranged to control suitable signal, or temperature limiting, control circuits.

That a properly calibrated voltage responsive device, when connected across the field winding of a dynamo-electric machine, will be responsive to temperature rise of the machine can be explained by the following theory. The temperatures of the various windings of a dynamo-electric machine are usually about the same. The temperature rise of the field winding of a dynamo-electric machine is substantially directly proportional to the watts dissipated in the winding. When the required watts necessary to produce a given temperature rise, above a given ambient temperature, are being dissipated in the field winding, the winding will have a definite resistance and a definite current will be flowing through it. Consequently there will be a definite voltage drop across the winding. If the resistance of the winding was independent of its temperature, changes in ambient temperature would not change the voltage drop across the field winding. Consequently the watts dissipated in the field winding would be constant thereby causing a constant temperature rise regardless of the ambient temperature. Actually, the resistance of the field winding usually changes slightly with changes in ambient because changes in ambient obviously will cause changes in field winding temperature, for a constant input to the field, and most field windings have a temperature coefficient of resistance which is other than zero. However, the changes in field winding resistance, which tend to change the voltage drop across the field winding, are largely compensated for by the changes in current necessary to have constant watts dissipated in the field winding. Thus, with a field winding having a positive temperature coefficient of resistance, a drop in ambient temperature will first cause a slight decrease in field winding resistance, thereby decreasing the voltage drop across the field winding for a given field current, and also decreasing the watts dissipated. If now the current is increased both the field voltage and the watts increase and when the field voltage is the same as at the higher ambient the watts will also be substantially the same. Therefore the field temperature rise will be substantially the same as at the higher ambient. Actually, the temperature rise will be slightly higher, for a given field voltage, at the lower ambient because the voltage drop increases as the first power of the field current whereas the field watts increase as the square of the current.

For most practical purposes the voltage responsive device can be set for the voltage at the maximum permissible field temperature. For example, it can be set to limit the voltage rise to 80° at 40° ambient, or a maximum temperature of 120°. At lower ambients such a voltage relay normally will hold slightly higher temperature rises but as these rises will never produce a temperature of 120° they will really not be harmful. If the temperature rise is to be substantially limited to a maximum value, the voltage relay can be set to hold this rise at the lowest ambient temperature encountered in operation. The rise which is permitted will then normally decrease with increases in ambient. Another way would be to compensate the field winding for resistance changes with temperature. For example, if a suitable negative coefficient resistance were connected in series with the usual copper field winding the overall coefficient could be made zero. A properly calibrated voltage relay would then hold a fixed temperature rise at all ambients.

At this point it should be stated that the most common cause of machine overheating is overloading and not the failure of the cooling system. By overloading I mean exceeding the volt-ampere rating of the machine. In the case of synchronous motors and generators and synchronous condensers this overloading may occur at relatively light real power loads. My invention only protects machines against the temperature rise produced by overloading and not against temperature rises produced by cooling system failures. An object of my invention is to provide a new and improved protective system for electrical machinery.

Another object of my invention is to provide a system for limiting the temperature rise of electrical machinery.

My invention will be better understood from the following description, taken in connection with the accompanying drawing, and its scope will be pointed out in the appended claims.

Referring now to the drawing, I have shown therein an electrical machine 1, which is illustrated as a synchronous dynamo-electric machine and which it will be assumed is a synchronous condenser. Machine 1 is provided with a field winding 2, which is connected to be energized by an exciter 3 while the armature of machine 1 is connected to a power circuit 4. Associated with machine 1 is an automatic regulator 5, which need not be of any particular type and which is shown by way of example as a voltage regulator of the type disclosed and claimed in Patent No. 1,848,852, granted March 8, 1932, on an application of Louis W. Thompson and assigned to the assignee of the present application. Regulator 5 includes a voltage responsive operating device, such as a torque motor 6, which is connected to the circuit 4, preferably through potential transformers 7, so as to produce a torque which varies in accordance with the voltage of circuit 4. A suitable restraining spring 8 acts to bias torque motor 6 so that the motor will be rotated clockwise, through a given angle, when the voltage exceeds a predetermined value, which is determined by the strength of the spring, while the motor will be rotated counterclockwise if the voltage is below the predetermined value. Arranged to be moved by torque motor 6 are slow speed raise and lower contacts 9 and 10, respectively, and high speed raise and lower contacts 11 and 12, respectively. Contacts 9 and 10 are arranged to cooperate with a center contact member 13, while the high speed contacts 11 and 12 are arranged to cooperate with a center contact member 14. Center contact members 13 and 14 are connected through conductors 15 and 16 to the positive side of a suitable control circuit 17. Contacts 9 and 10 are arranged to control the operation of a pilot motor 18 through suitable reversing field windings 19 and 20, respectively. Pilot motor 18 is arranged to operate a variable rheostat 21 in the field circuit of exciter 3. Under the control of high speed raise and lower contacts 11 and 12, are high speed raise and lower relays, or contactors, 22 and 23, respectively. Relay 22 is normally open and is arranged to short circuit the entire rheostat 21 when it is actuated. High speed lower relay 23 is normally closed and normally short circuits a resistance 24 connected in the field winding circuit of exciter 3. When high speed lower relay 23 is actuated it opens its contacts thereby inserting the resistance 24 in the field circuit.

Connected to be responsive to the voltage of field winding 2, and therefore to be responsive to the temperature rise of machine 1, as has been previously explained, is a voltage relay 25. Under the control of voltage relay 25 is a time delay relay 26 which may have its action delayed in any way and which is illustrated as being provided with a dash pot 27 for this purpose. Relay 26 has a set of normally open contacts 28 which are adapted to complete an energizing circuit for a signal, shown as a bell 29. This energizing circuit is from the positive side of the supply source 17 through conductor 16 and signal 29, the contacts 28 and back to the negative side of the supply source through a conductor 30. Relay 26 is provided with another set of normally open contacts 31 which are arranged to complete a circuit for energizing motor 18 to operate it, in the proper direction for increasing the resistance value of rheostat 21, provided this resistance value is below a predetermined value. This circuit is from conductor 16, through contacts 31, conductor 32, rheostat arm 33, contact 34, field winding 20, armature 18 and back to the other side of the supply source through the conductor 30. Relay 26 is provided with two additional sets of normally closed contacts, 35 and 36, which are connected respectively in the circuits controlled by the high speed raise contact 11 and the low speed raise contact 9.

In addition to controlling the time delay protective relay 26 in response to temperature rise, through the action of the voltage responsive relay 25, it may also sometimes be desirable to control protective relay 26 in response to overloads on the main machine 1 and for this purpose I provide a current relay 37 connected in one of the line conductors of machine 1. The normally open contacts of both relays 25 and 37 are connected in parallel selectively to close a circuit, including the operating winding of relay 26, which is connected to the supply source 17 through conductors 15, 16 and 30.

In case it should be desired to control the value of resistance 21 manually, I provide a simple single pole double throw switch 38 arranged to connect motor 18 across the supply source 17, selectively, through either one of its field windings 19 or 20. I have also shown damping means in the form of an oil pot 39 for damping the action of the torque motor 6 and thereby improving the operation of the voltage regulator. The usual field rheostat 40 is also shown connected in the circuit of field winding 2.

The regulator action, which is described in detail in the above identified Thompson patent, is briefly as follows: With normal voltage on circuit 4 the electrical torque produced in torque motor 6 will exactly balance the counter torque of spring 8 and none of the contacts 9, 10, 11 or 12 will be in engagement with their respective center contacts 13 and 14. Resistance 21 will also necessarily be of the proper value to produce normal voltage. Assume now that the voltage of circuit 4 should decrease. This would decrease the electrical torque in torque motor 6 and the spring 8 would overcome the torque of the motor and thereby cause the engagement between contacts 9 and 13. The following circuit would thereby be completed: Conductor 16, conductor 15, contact 13, contact 9, normally closed contacts 36, field winding 19, motor 18 and conductor 30 to the other side of the supply source. Completion of this circuit would cause motor 18 to operate in such a direction as to cause rheostat arm 33 to short circuit more and more of resistance 21 thereby increasing the voltage of exciter 3 and consequently increasing the excitation and the voltage of machine 1. If the voltage decrease has not been severe this action will continue until the voltage is returned to normal, whereupon contact 9 will leave contact 13 and conditions will be as have been described heretofore. However, if the voltage decrease has been severe the difference between the electrical torque of motor 6 and the mechanical torque of spring 8 will be so great as to flex contact 9 thereby causing engagement between contacts 11 and 14. The following circuit will thereby be completed: Conductor 16, conductor 15, contacts 14 and 11, normally closed contacts 35, the operating winding of relay 22 and back to the other side of the supply source through conductor 30. As soon as contactor 22 operates the entire resistance 21 is short circuited thereby producing a relatively rapid increase in excitation of the exciter and consequently a relatively rapid increase in excitation and voltage of the main machine. In a similar manner, if the voltage of circuit 4 should increase above normal relatively slightly the engagement of contacts 10 and 13 will cause the energization of motor 18 through the lowering field winding 20 thereby causing a reverse operation of this motor and an increase in the resistance 21. This decreases the excitation of both machines 3 and 1 and thereby reduces the voltage. A relatively large increase in voltage on circuit 4 will cause engagement between contacts 12 and 14 through the flexing of contact 10. This will cause operation of high speed lowering contactor 33 which acts to insert suddenly the relatively large resistance 24 in the field circuit of exciter 3, thereby suddenly decreasing its excitation by a relatively large amount, which in turn acts to decrease the excitation and consequently the voltage of main machine 1.

During the above described operation the instantaneous voltage of field winding 2 may increase considerably above the voltage value corresponding to the rated, or guaranteed, temperature rise of machine 1. Consequently relay 25 may operate several times, but the time delay feature of relay 26 is so calibrated that under normal operation of the regulator the duration of these transient high voltages will not be sufficient to cause operation of relay 26. If, however, operating conditions on circuit 4 should become so extreme as to require abnormally high excitation, the steady state value of the voltage across field winding 2 may reach the predetermined maximum value corresponding to the rated temperature rise of the machine. When this happens, relay 25 closes its contacts thereby completing the energizing circuit for relay 26, which in a predetermined time will operate. As soon as relay 26 operates, signal 29 will be energized, as has previously been described. Similarly, the opening of contacts 35 and 36 will effectively prevent the regulator from further increasing the energization of field winding 2. If the resistance 21 is below a value corresponding to full load, or rated, field current in field winding 2, contact 34 is so adjusted that it will be in engagement with contact arm 33, while as soon as this resistance corresponds to the value which is equal to or greater than the resistance necessary for producing full load field current, contacts 34 and 33 will be out of engagement. Consequently, when contacts 31 of relay 26 close, a circuit will be completed through the lowering winding 20 of the motor 18, thereby causing this motor to operate to increase the resistance 21 in case this resistance is of too low a value. This action will continue until the resistance 21 is of the proper value to produce full load current in field winding 2, whereupon contacts 34 and 33 will separate thereby stopping motor 18.

The time delay feature of relay 26 is also important in preventing the operation of the protective equipment in cases of transient voltages induced in the field winding 2 by transient disturbances on main circuit 4. This time delay feature also prevents operation of relay 26 by relay 37 in case of transient overload currents.

In case the current in circuit 4 exceeds a predetermined high value for a predetermined length of time relay 37 will cause the operation of relay 26 which will then initiate all of the above described operations.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:—

1. In combination, a synchronous dynamo electric machine having a direct current field winding, an automatic voltage regulator for said machine for varying the energization of said field winding, a voltage responsive relay connected across said field winding and arranged to operate at a predetermined maximum field voltage, a time delay relay arranged to be operated by the operation of said field voltage responsive relay, said time delay relay having means for preventing said regulator from increasing the energization of said field winding when said time delay relay operates, said relay having additional means for causing the energization of said field winding to be lowered to a predetermined value in case it is above said value when said time delay relay operates.

2. In combination, a dynamo electric machine having a direct current field winding, an automatic regulator of an operating condition of said machine for varying the energization of said field winding, a relay connected to respond to the voltage of said field winding and having contacts adapted to be closed when the voltage across said field winding exceeds a predetermined value, a relay connected to respond to the current in said machine and having contacts adapted to be closed when said current exceeds a predetermined value, a time delayed relay arranged to be operated by the closing of the contacts of either of said two first mentioned relays, a signal arranged to be operated by the operation of said time delay relay, means for preventing said regulator from increasing the energization of said winding when said time delayed relay operates, and means for reducing the energization of said field winding to a predetermined value if it is above said value when said time delayed relay operates.

3. In combination, an electric machine having organic insulating material whose maximum permissible temperature rise above any one of a normal range of ambient temperatures as a result of overloading of said machine is to be a substantially constant value which is determined by considerations of the effect of high temperature upon the deterioration of said insulation, a variably energized winding on said machine whose watts dissipated therein is substantially a function of said temperature rise, and means for limiting the energization of said winding to a value of watts dissipated therein which corresponds to said predetermined temperature rise.

4. In combination, an electric machine having organic insulating material whose maximum permissible temperature rise above any one of a normal range of ambient temperatures as a result of overloading of said machine is to be a substantially constant value which is determined by considerations of the effect of high temperature upon the deterioration of said insulation, a variably energized winding on said machine whose watts dissipated therein is substantially a function of said temperature rise, and means responsive to the energization of said winding for indicating when the watts dissipated therein corresponds to said predetermined temperature rise.

EUGENE M. HUNTER.